(12) United States Patent
Shimada et al.

(10) Patent No.: US 9,244,276 B2
(45) Date of Patent: Jan. 26, 2016

(54) HEAD-UP DISPLAY DEVICE

(71) Applicant: Yazaki Corporation, Tokyo (JP)

(72) Inventors: Takahiro Shimada, Shimada (JP); Junichi Sasaki, Shimada (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 14/276,074

(22) Filed: May 13, 2014

(65) Prior Publication Data
US 2014/0247501 A1 Sep. 4, 2014

Related U.S. Application Data

(63) Continuation of application No. PCT/JP2012/083166, filed on Dec. 14, 2012.

(30) Foreign Application Priority Data

Dec. 15, 2011 (JP) .................................. 2011-274714

(51) Int. Cl.
G02B 27/14 (2006.01)
G09G 5/00 (2006.01)
G02B 27/01 (2006.01)

(52) U.S. Cl.
CPC ............ *G02B 27/0149* (2013.01); *G02B 27/01* (2013.01); *G02B 27/0101* (2013.01); *G02B 2027/015* (2013.01)

(58) Field of Classification Search
CPC ........... G02B 27/0101; G02B 27/0172; G02B 2027/0178
USPC ....................... 359/630, 633; 345/8; 351/158; D14/372; D16/309
See application file for complete search history.

(56) References Cited

U.S. PATENT DOCUMENTS 4,961,625 A 10/1990 Wood et al.
5,231,379 A 7/1993 Wood et al.
(Continued)

FOREIGN PATENT DOCUMENTS

CN 101526680 A 9/2009
CN 101876753 A 11/2010
(Continued)

OTHER PUBLICATIONS

International Preliminary Report on Patentability, dated Jun. 17, 2014, issued by the International Searching Authority in International Application No. PCT/JP2012/083166.
(Continued)

*Primary Examiner* — William Choi
(74) *Attorney, Agent, or Firm* — Sughrue Mion, PLLC

(57) ABSTRACT

A head-up display device projects a display light on a windshield of a vehicle to form a virtual image thereon. The device includes a casing, an indicator which is attached to the casing to emit the display light into the casing, a light guide path through which the display light emitted from the indicator is guided, and a wiring board which is provided with a driving circuit for driving the indicator. The casing includes a guide rail formed along an irradiation direction of the display light from the indicator to support both lateral portions of the wiring board on the guide rail, and the wiring board is attached in a containing space of the casing formed between the light guide path and an inner surface of the casing by guiding and sliding the wiring board along the irradiation direction of the display light with the guide rail.

6 Claims, 6 Drawing Sheets

(56) References Cited

U.S. PATENT DOCUMENTS

2009/0225242 A1 9/2009 Sato
2011/0061482 A1 3/2011 Maruyama et al.

FOREIGN PATENT DOCUMENTS

| EP | 0 177 134 A2 | 4/1986 |
| EP | 2 287 496 A1 | 2/2011 |
| JP | 11278100 A | 10/1999 |
| JP | 2002134963 A | 5/2002 |
| JP | 2008-55940 A | 3/2008 |
| JP | 2010-15037 A | 1/2010 |
| WO | 89/03059 A2 | 4/1989 |

OTHER PUBLICATIONS

International Search Report (PCT/ISA/210), dated Jan. 10, 2014, issued by the International Searching Authority in counterpart International Patent Application No. PCT/JP2012/083166.

Written Opinion (PCT/ISA/237), dated Jan. 10, 2014, issued by the International Searching Authority in counterpart International Patent Application No. PCT/JP2012/083166.

Office Action Japanese Patent Office, dated Jun. 16, 2015, in counterpart Application No. 2011-274714.

Communication from the State Intellectual Property Office of P.R. China dated Sep. 6, 2015 in a counterpart Chinese application No. 201280061963.1.

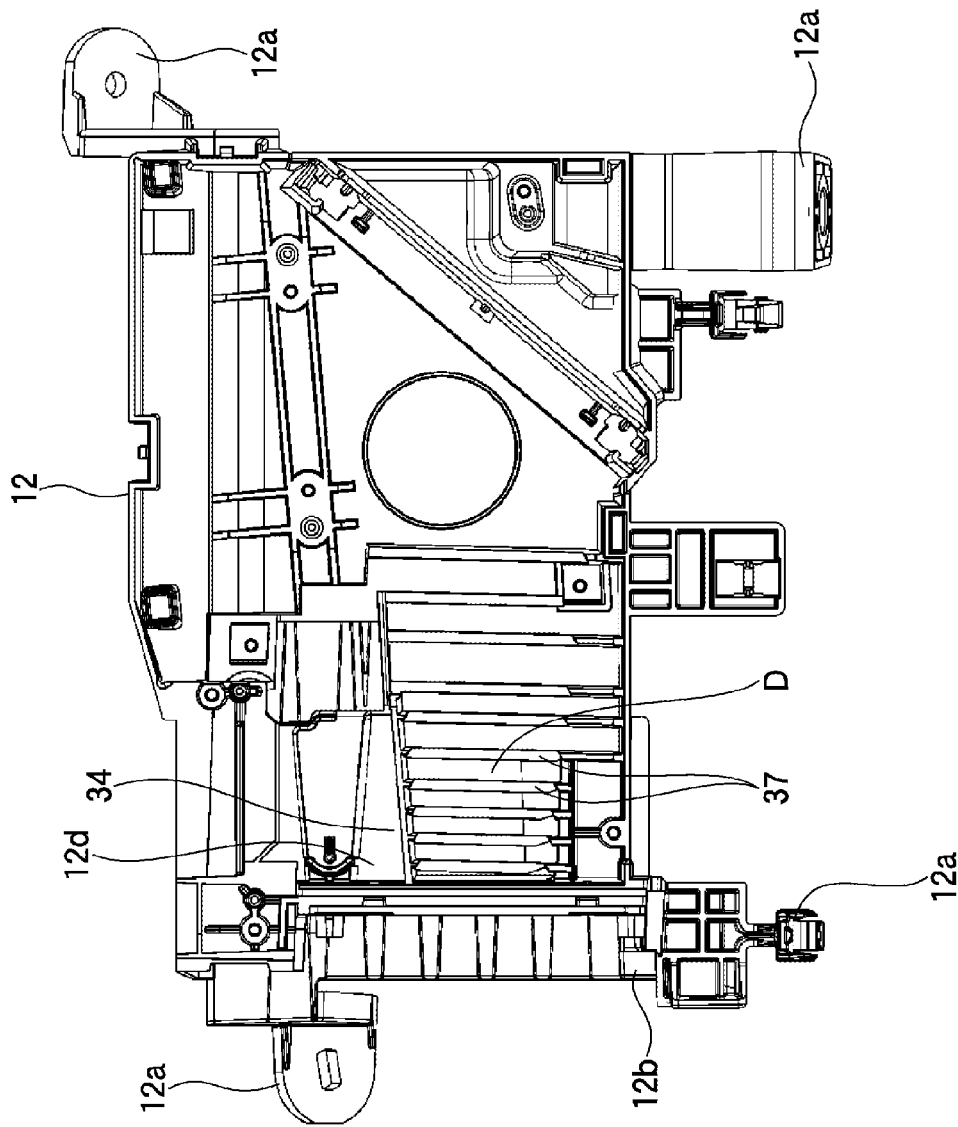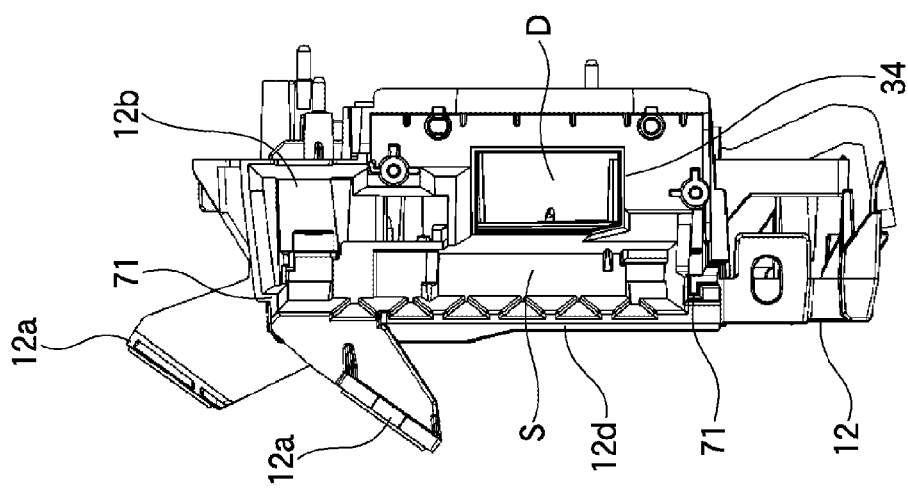

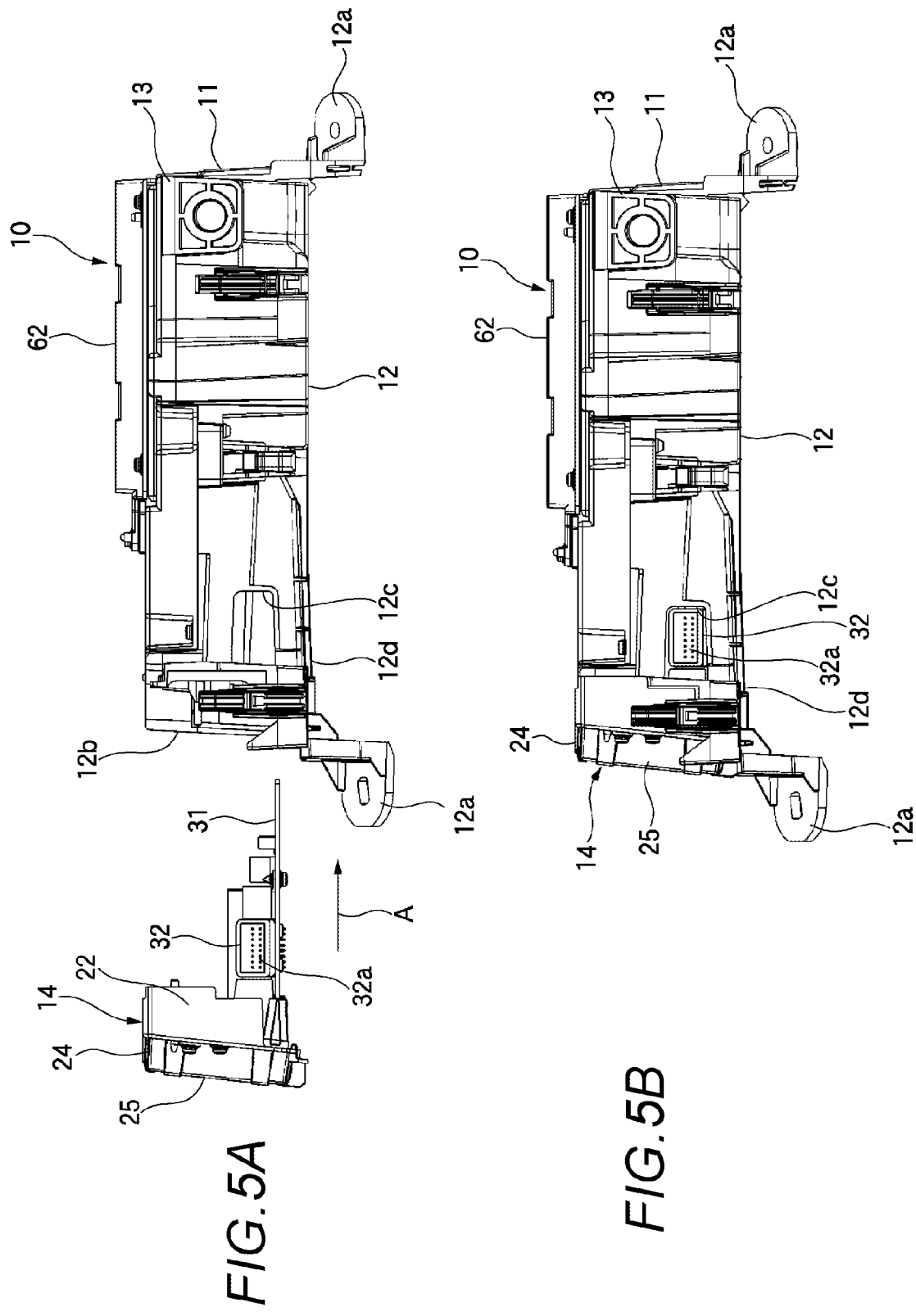

HEAD-UP DISPLAY DEVICE

CROSS REFERENCE TO RELATED APPLICATIONS

This application is a continuation of PCT application No. PCT/JP2012/083166, which was filed on Dec. 14, 2012 based on Japanese Patent Application (No. 2011-274714) filed on Dec. 15, 2011, the contents of which are incorporated herein by reference.

BACKGROUND OF THE INVENTION

1. Field of the Invention

The present invention relates to a head-up display device capable of projecting a virtual image on a projection area of a windshield in a vehicle, and allowing the projected virtual image and a foreground of the vehicle to be superimposed and visually recognized through the windshield from an eye point of the vehicle.

2. Description of the Related Art

In recent years, with increased and diversified information required by a driver for driving a vehicle, head-up display devices (HUDs) that display a virtual image of information to be notified the driver of such as information high in the degree of urgency on a window shield of a vehicle, and allow the virtual image and a foreground of the vehicle in a superimposed manner have been employed for driver seats of the vehicles such as automobiles or trains.

As illustrated in FIG. 6, the head-up display device includes an indicator 1 for emitting a display light L, a casing 2 onto which the display light L is incident from the indicator 1, reflective plates 4 and 5 received in the casing 2 to reflect the display light L incident in the casing 2 and then guide it to an opening 3 provided in the casing 2, and a transparent plate 6 covering the opening 3 (see JP-A-2008-55940 and JP-A-2010-15037).

SUMMARY OF THE INVENTION

The head-up display device includes a wiring board 7 provided with a driving circuit for driving the indicator 1. The wiring board 7 is mounted in the casing 2 from a lateral direction. The wiring board 7 mounted by such a manner is connected to the indicator 1, and then the mounted portion of the wiring board 7 is covered with a cover 8.

In such an mount structure, since the mounting workability of the wiring board 7 is poor, and the cover 8 which is separate from the casing 2 is required, these facts cause cost increases and size increases in the device.

The present invention has been made in view of the above circumstances, and an object of the present invention is to provide a compact head-up display device of which mounting workability is improved and a cost is decreased by reducing the number of components.

A head-up display device according to the present invention is configured by any one of the following configurations (1) to (3).

(1) A head-up display device for projecting a display light on a windshield of a vehicle to form a virtual image thereon, the head-up display device including: a casing; an indicator which is attached to the casing to emit the display light into the casing; a light guide path through which the display light emitted from the indicator is guided; and a wiring board which is provided with a driving circuit for driving the indicator, wherein the casing includes a guide rail formed on an inner surface of a lateral wall at one end side of the casing along an irradiation direction of the display light from the indicator to support both lateral portions of the wiring board on the guide rail, and the wiring board is attached in a containing space of the casing formed between the light guide path and an inner surface of the casing by guiding and sliding the wiring board along the irradiation direction of the display light with the guide rail.

(2) The head-up display device according to the configuration (1), wherein the indicator is integrally mounted on the wiring board, and as the wiring board is slid and attached in the casing, the indicator is mounted in the casing.

(3) The head-up display device according to the configuration (1) or (2), wherein the containing space is formed between the light guide path and a bottom surface of the casing, and the wiring board is accommodated in substantially parallel with the bottom surface of the casing in the containing space.

According to the head-up display device of the configuration (1), the wiring board is attached in the containing space formed between the light guide path in the light guide frame and the bottom surface of the lower casing in the lower casing by guiding and sliding the wiring board along the irradiation direction of the display light from the indicator with the guide rail. Accordingly, as compared to the structure of which a wiring board is attached to the side of a casing and is closed with a cover, the mounting workability of the wiring board can be remarkably improved, and can be reduced in size. Also, since separate components, such as a cover, are not necessary, these facts can cause a cost lower.

According to the head-up display device of the configuration (2), as the wiring board is slid and attached in the lower casing, the indicator assembly including the indicator integrally mounted on the wiring board is also attached to the lower casing. Accordingly, as compared to the structure in which an indicator and a wiring board which are separately formed are mounted in the casing, the mounting process of the components can be reduced, and the work of connecting the indicator and the wiring board with connectors can be omitted, thereby remarkably improving the mounting workability. Furthermore, as the indicator and the wiring board are mounted in the casing and then are connected to each other by the connector, a defect, such as misalignment of the indicator, can be eliminated, thereby making the head-up display device with high-precision projection.

According to the head-up display device of the configuration (3), since the wiring board is disposed and accommodated in a horizontal direction along (in substantially parallel with) the bottom surface of the lower casing in the containing space formed between the light guide path in the light guide frame and the bottom surface of the lower casing, the whole height dimension of the head-up display device can be lowered, as compared to the structure in which the wiring board is disposed in a vertical direction.

The present invention can provide the compact head-up display device of which mounting workability is improved and a cost is decreased by reducing the number of components.

As described above, the present invention is briefly explained. A detail of the present invention will be apparent by reading the embodiment for carrying out the invention as explained later with reference to the accompanying drawings.

BRIEF DESCRIPTION OF THE DRAWINGS

FIG. 4A is a front view of the lower casing.

FIG. 4B is a plan view of the lower casing.

FIGS. 5A and 5B are side views of the head-up display device, both explaining the mounting work of the indicator assembly and the wiring board.

DETAILED DESCRIPTION OF THE EXEMPLARY EMBODIMENTS

Hereinafter, an embodiment of the present invention will be described with reference to the accompanying drawings.

In this embodiment, a head-up display device using a VFD (Vacuum Fluorescent Display), such as AMVFD (Active Matrix Vacuum Fluorescent Display), as an indicator will be described herein.

Figure 1:
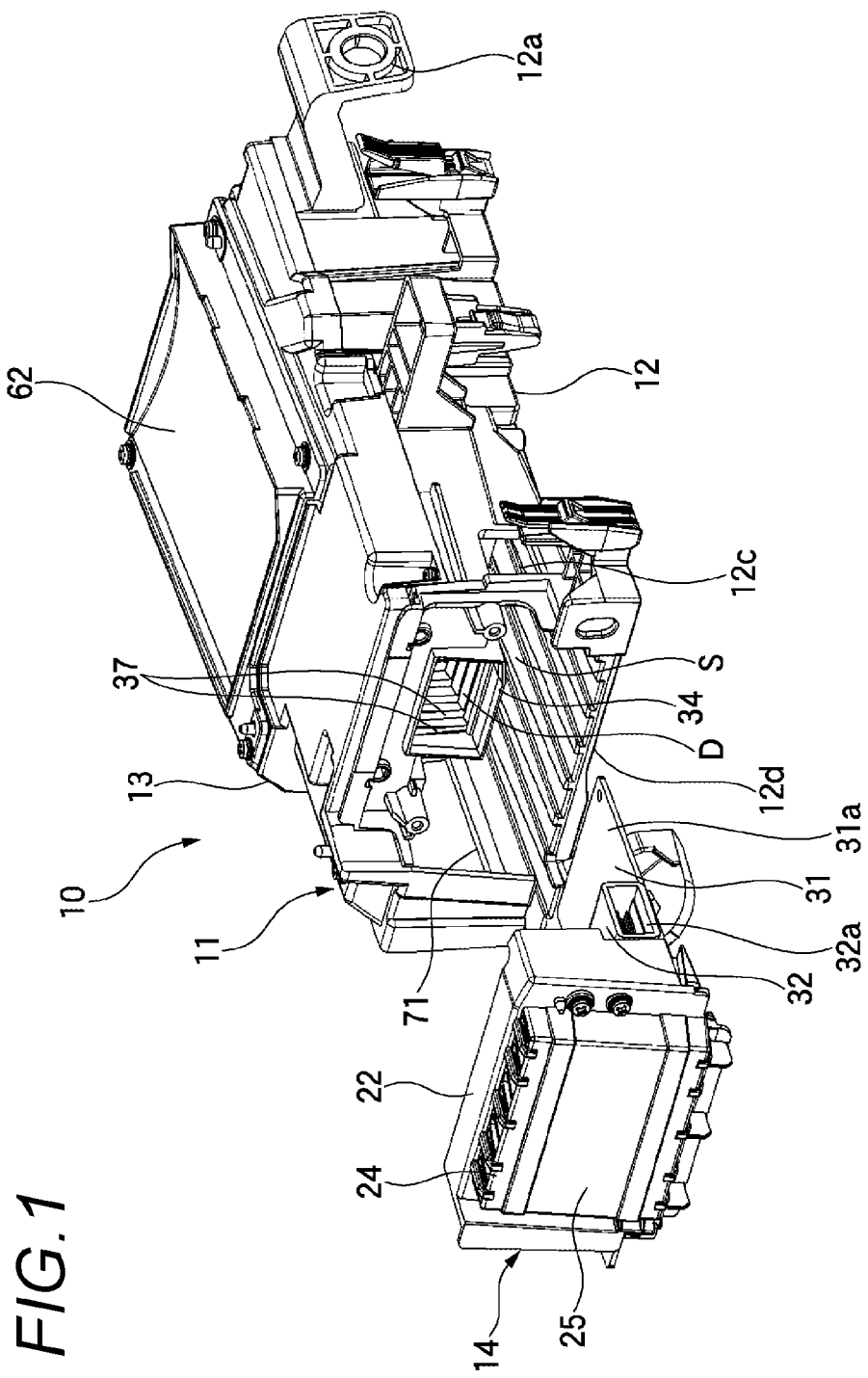
FIG. 1 is a perspective view illustrating a head-up display device according to an embodiment of the present invention, from which an indicator assembly and a wiring board are detached.
Figure 2:
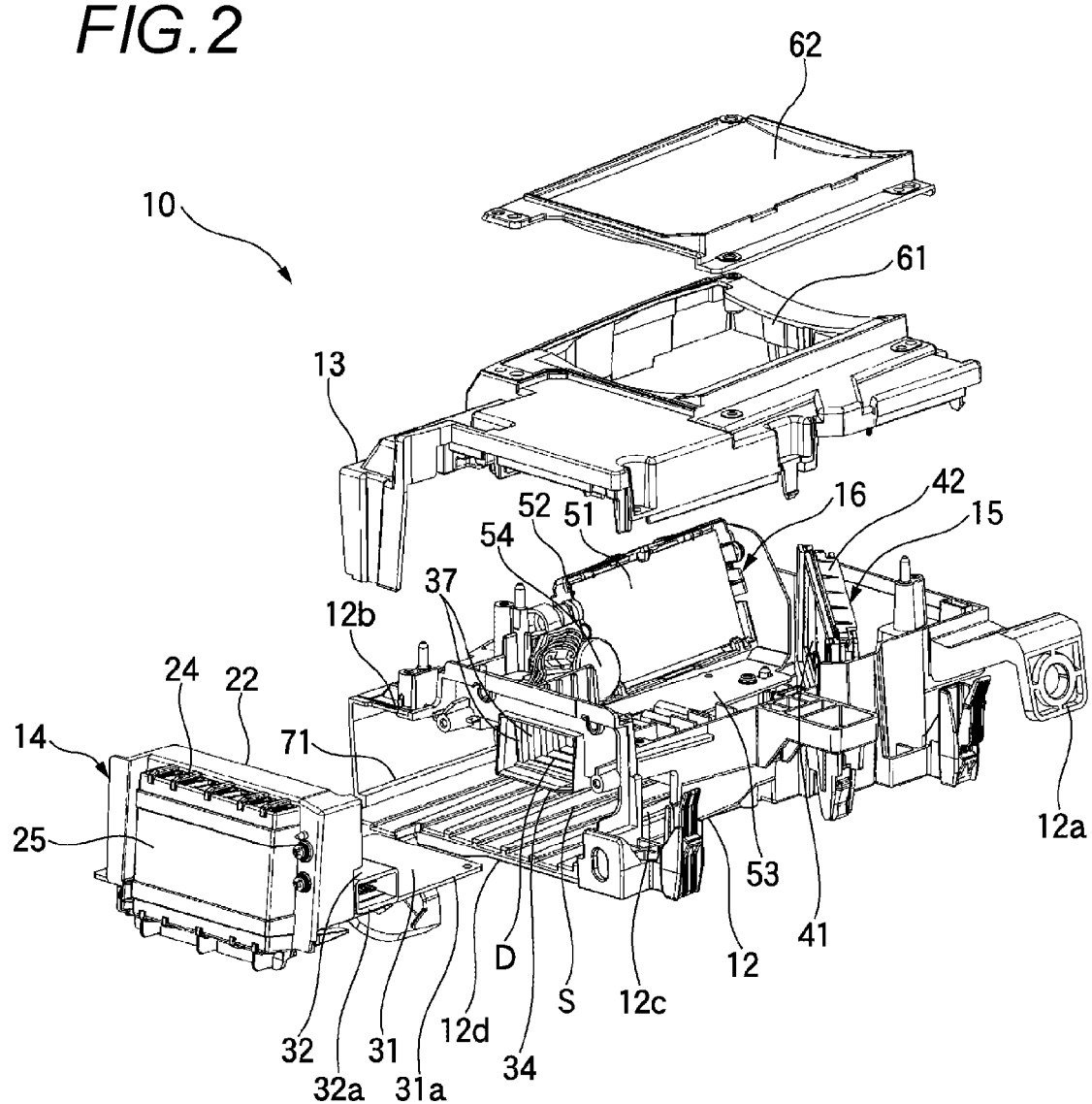
FIG. 2 is an exploded perspective view of the head-up display device according to the embodiment of the present invention.
Figure 3:
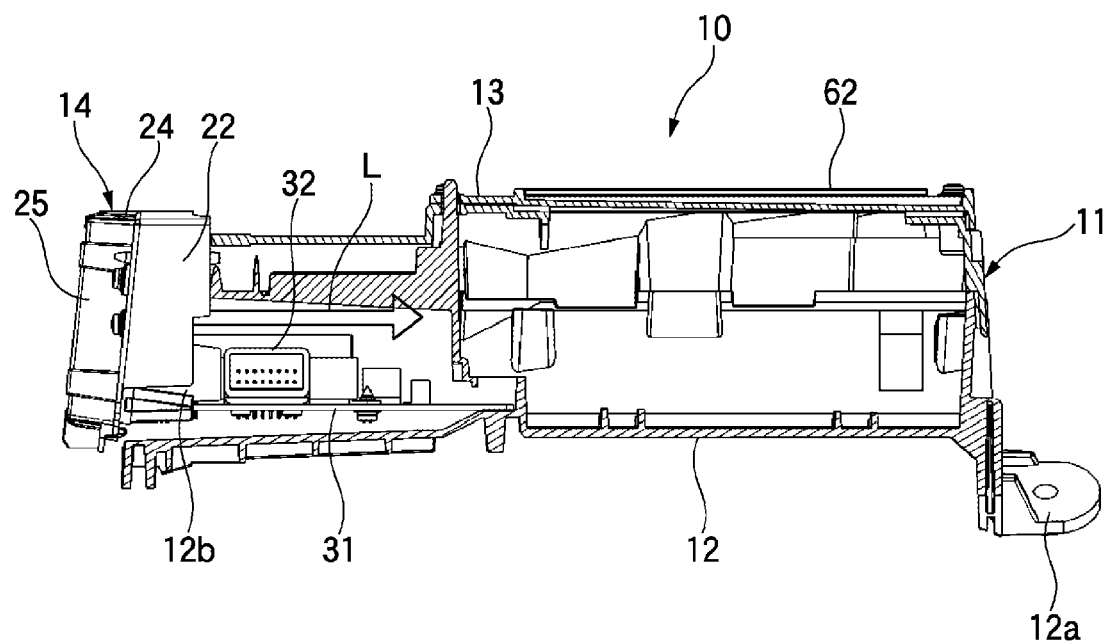
FIG. 3 is a cross-sectional view of the head-up display device according to the embodiment of the present invention.
Figure 6:
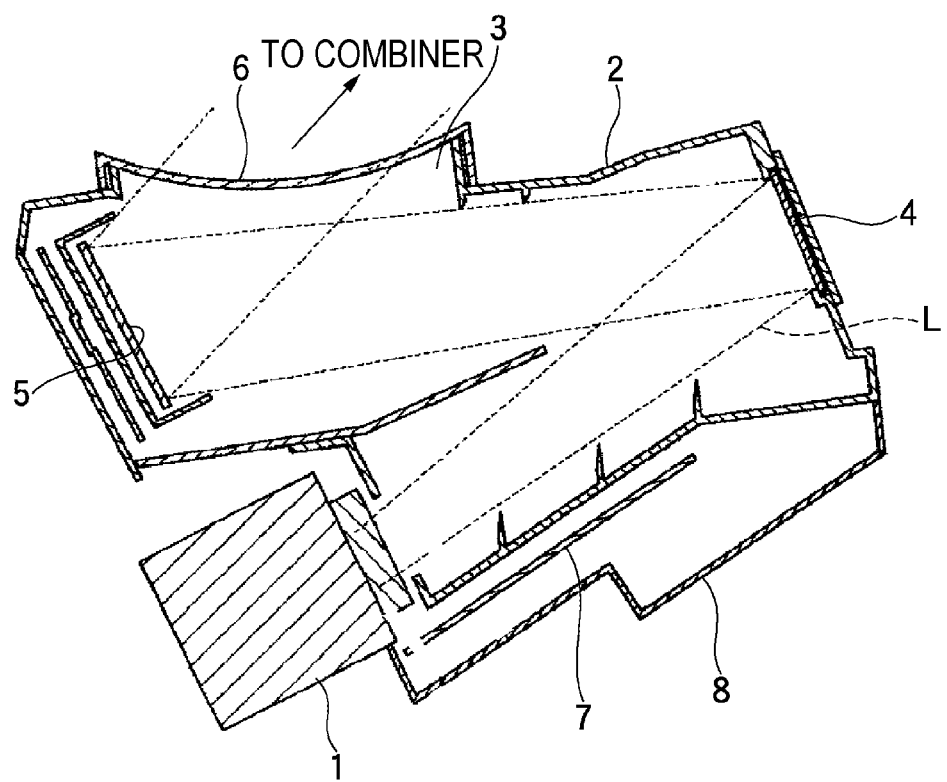
FIG. 6 is a horizontal cross-sectional view of a head-up display device according to the related art.

FIG. 1 is a perspective view illustrating a head-up display device according to the embodiment of the present invention, from which an indicator assembly and a wiring board are detached. FIG. 2 is an exploded perspective view of the head-up display device according to the embodiment of the present invention. FIG. 3 is a cross-sectional view of the head-up display device according to the embodiment of the present invention. FIGS. 4A and 4B illustrates the configuration of a lower casing, in which FIG. 4A is a front view of the lower casing, and FIG. 4B is a plan view of the lower casing. FIGS. 5A and 5B are side views of the head-up display device, both explaining the mounting work of the indicator assembly and the wiring board.

As illustrated in FIGS. 1 to 3, a head-up display device 10 includes a casing 11. The casing 11 includes a lower casing 12 and an upper casing 13. The casing 11 is configured by attaching the upper casing 13 to an upper portion of the lower casing 12.

An indicator assembly 14, a flat mirror assembly 15, and a driving mirror assembly 16 are mounted on the lower casing 12.

The indicator assembly 14 is mounted on one end side of the lower casing 12. The flat mirror assembly 15 is mounted on the other end side of the lower casing 12. Also, the drive mirror assembly 16 is mounted on one lateral portion of the lower casing 12.

The indicator assembly 14 has an indicator 22 made of a VFD (Vacuum Fluorescent Display), such as AMVFD, a heat sink 24, and a heat sink cover 25, which are integrated by a fixing means, such as a screw. The indicator assembly 14 irradiates display light L (see FIG. 3) onto a front surface side from the indicator 22. The irradiating path of the display light L emitted from the indicator 22 corresponds to an optical guide path D.

The indicator assembly 14 is mounted on the wiring board 31. The wiring board 31 is provided with a driving circuit for driving the indicator 22 of the indicator assembly 14, and the indicator assembly 14 is integrally mounted on one end side of the wiring board 31 at its surface side. In this way, the wiring board 31 extends along the irradiation direction of the display light L from the indicator 22 of the indicator assembly 14. Also, a connector 32 is mounted on the wiring board 31, and a connection port 32a of the connector 32 faces in a lateral direction.

As illustrated in FIGS. 4A and 4B, the lower casing 12 is provided with a light guide frame 34 which is formed in a shape of a square tube to enclose the light guide path D, at the front surface of the indicator assembly 14. The display light L irradiated from the indicator assembly 14 is guided to the other end side of the lower casing 12 through the light guide frame 34. Also, the lower casing 12 is provided with a plurality of ghost preventing ribs 37, which are formed along a direction perpendicular to the irradiation direction, on an inner peripheral surface of the light guide frame 34 and a bottom surface ahead of the irradiation direction of the display light L rather than the light guide frame 34. The ghost preventing ribs 37 prevent formation of a virtual image due to diffused reflection of the display light L that is irradiated from the indicator assembly 14.

The flat mirror assembly 15 has a flat mirror 41 and a bezel 42, and the flat mirror 41 is fixed to the lower casing 12 by the bezel 42. The flat mirror assembly 15 is disposed ahead of the irradiation direction of the indicator light L from the display 22 of the indicator assembly 14, and is gently inclined in the lateral direction with respect to the irradiation direction of the display light L. In this way, the flat mirror assembly 15 reflects the display light L irradiated from the indicator 22 toward the driving mirror assembly 16 at one lateral portion of the lower casing 12 by the flat mirror 41.

The driving mirror assembly 16 has a reflective mirror 51 made of an aspherical mirror, for example, a concave mirror, a holder 52, a base plate 53, and a step motor 54. The reflective mirror 51 is held by the holder 52, and the holder 52 is pivotally supported by the base plate 53 so that it pivots around a horizontal axis. The driving mirror assembly 16 is fixed to the lower casing 12 by screwing the base plate 53 to the bottom surface of the lower casing 12. The step motor 54 pivots the holder 52 holding the reflective mirror 51, that is, the holder 52 is pivoted by the step motor 54, so that the direction of the reflective mirror 51 is changed.

The display light L reflected from the flat mirror 41 of the flat mirror assembly 15 is guided to the reflective mirror 51 of the driving mirror assembly 16. The reflective mirror 51 enlarges and reflects the display light L in an upward direction. In this instance, as the holder 52 is pivoted by the step motor 54 of the driving mirror assembly 16, the irradiation direction of the display light L is changed.

The casing 11 is configured by attaching the upper casing 13 to the upper surface of the lower casing 12 with screw fixing or the like, and thus the inside of the casing 11 is in a light-shielding state. The upper casing 13 has an opening 61 at a light guiding portion of the display light L which is reflected from the reflective mirror 51, and an outer glass 62 is attached to cover the opening 61.

The lower casing 12 is provided with a plurality of brackets 12a around the lower casing 12, and the head-up display device 10 is fixed to a given mounting portion in an instrument panel by screwing the bracket 12a to the instrument panel.

In the head-up display device 10 including the above configuration, the display light L irradiated from the indicator 22 configuring the indicator assembly 14 passes through the light guide path D of the lower casing 12, and is reflected from the flat mirror 41. After the display light L is enlarged and reflected by the reflective mirror 51, the display light L is emitted through the outer glass 62 in the opening 61 of the upper casing 13. Then, the display light L passes through the opening of the instrument panel, and is reflected by the windshield, so that it is guided to an eye range of the driver.

In this way, the driver can visually recognize the projected virtual image and a foreground of the vehicle to be superimposed and visually recognized through the windshield from the eye point of the vehicle.

Next, the concrete mounting structure in which the wiring board 31, on which the indicator assembly 14 is integrally mounted, in the lower casing 12 will be described.

As illustrated in FIGS. 1 and 2, the lower casing 12 is provided with guide rails 71, which extend in the irradiation direction of the display light L from the indicator 22, on the inner surface of both lateral walls at one end side thereof. The guide rails 71 guide both edges 31*a* of the wiring board 31, so that both edges 31*a* of the wiring board 31 are laid on the upper portion of the guide rails 71. Also, the lower casing 12 is provided with a containing space S formed between the bottom surface 12*d* and the light guide path D in the light guide frame 34, and the wiring board 31 is accommodated in the containing space S.

In order to attach the wiring board 31, on which the indicator assembly 14 is mounted, to the lower casing 12, as illustrated in FIG. 5A, the wiring board 31 is slid from the opening 12*b* formed on one end side of the lower casing 12 in a direction of the arrow A in the drawing.

Specifically, both edges 31*a* of the wiring board 31 on a side of the end, which is opposite to the indicator assembly 14, are first caught by the guide rail 71. Then, the wiring board 31 is pushed into the lower casing 12 together with the indicator assembly 14. Then, the wiring board 31 is guided to the containing space S in the lower casing 12, while both edges 31*a* are guided by the guide rail 71.

The indicator assembly 14 is pushed until it abuts against the end face of the lower casing 12. Then, the indicator assembly 14 is in close contact with a plane of the opening 12*b* of the lower casing 12, and the indicator 22 abuts against the light guide frame 34. If the indicator assembly 14 abuts against the end face of the lower casing 12, a claw portion (not illustrated) provided on the lower casing 12 locks a claw receiving portion (not illustrated) provided on the indicator assembly 14. In this way, the indicator assembly 14 is held by the lower casing 12. Also, the connection port 32*a* of the connector 32 of the wiring board 31 is disposed on a window portion 12*c* formed on the side of the lower casing 12, so that a mating connector can be inserted or detached into or from the connection port 32*a* of the connector 32.

In this instance, the indicator assembly 14 is screwed to the lower casing 12. In this way, the indicator assembly 14 and the wiring board 31 are mounted in a lump in the lower casing 12.

According to the head-up display device according to this embodiment, the wiring board 31 is attached to be guided and slid along the irradiation direction of the display light L from the indicator 22 between the light guide path D in the light guide frame 34 and the bottom surface 12*d* of the lower casing 12 in the lower casing 12 by the guide rail 71. Accordingly, as compared to the structure of which a wiring board is attached to the side of a casing and is closed with a cover, the mounting workability of the wiring board 31 can be remarkably improved, and can be reduced in size. Also, since separate components, such as a cover, are not necessary, this can cause a cost lower.

As the wiring board 31 is slid and mounted in the lower casing 12, the indicator assembly 14 including the indicator 22 integrally mounted on the wiring board 31 is also mounted in the lower casing 12. Accordingly, as compared to the structure in which an indicator and a wiring board which are separately formed are mounted in the casing, the mounting process of the components can be reduced, and the work of connecting the indicator and the wiring board with connectors can be omitted, thereby remarkably improving the mounting workability. Furthermore, as the indicator and the wiring board are mounted in the casing and then are connected to each other by the connector, a defect, such as misalignment of the indicator, can be eliminated, thereby making the head-up display device 10 with high-precision projection.

In particular, since the wiring board 31 is disposed and accommodated in a horizontal direction along (in parallel with) the bottom surface 12*d* of the lower casing 12 in the containing space S formed between the light guide path D in the light guide frame 34 and the bottom surface 12*d* of the lower casing 12, the whole height dimension of the head-up display device 10 can be lowered, as compared to the structure in which the wiring board 31 is disposed in a vertical direction.

The present invention is not limited to the above-described embodiment, and a modification or an alteration are allowed. In addition, material, shape, size, number, location or the like of each component is arbitrary and not limited as long as they can attain the present invention.

According to the head-up display device having the above-described structure, it is possible to provide a compact head-up display device of which mounting workability is improved and a cost is decreased by reducing the number of components.

What is claimed is:

1. A head-up display device for projecting a display light on a windshield of a vehicle to form a virtual image thereon, the head-up display device comprising:
   a casing;
   an indicator which is attached to the casing to emit the display light into the casing;
   a light guide path through which the display light emitted from the indicator is guided; and
   a wiring board which is provided with a driving circuit for driving the indicator, wherein the casing includes a guide rail formed as an inner surface of a lateral wall of the casing at one end side of the casing along an irradiation direction of the display light from the indicator to support both lateral portions of the wiring board on the guide rail, and
   the wiring board is attached, by a slidable attachment, in a containing space of the casing formed between the light guide path and an inner surface of the casing and is configured to slide on the guide rail along the irradiation direction.

2. The head-up display device according to claim 1, wherein
   the indicator is integrally mounted on the wiring board, and
   the indicator is configured to be attached to the casing by the slidable attachment of the wiring board to the guide rail.

3. The head-up display device according to claim 1, wherein
   the containing space is formed between the light guide path and a bottom surface of the casing, and the wiring board is accommodated in substantially parallel with the bottom surface of the casing in the containing space.

4. The head-up display device according to claim 1, wherein the indicator is orthogonal to the irradiation direction and the wiring board.

5. The head-up display device according to claim 1, wherein the wiring board extends, in the irradiation direction, away from the indicator.

6. The head-up display according to claim 1, wherein the guide rail is configured to slide both lateral edges of the wiring board on the guide rail along the irradiation direction.

* * * * *